(12) United States Patent
Neuman

(10) Patent No.: US 7,797,609 B2
(45) Date of Patent: Sep. 14, 2010

(54) APPARATUS AND METHOD FOR MERGING DATA BLOCKS WITH ERROR CORRECTION CODE PROTECTION

(75) Inventor: Paul S. Neuman, Shoreview, MN (US)

(73) Assignee: Unisys Corporation, Blue Bell, PA (US)

( * ) Notice: Subject to any disclaimer, the term of this patent is extended or adjusted under 35 U.S.C. 154(b) by 1239 days.

(21) Appl. No.: 10/922,206

(22) Filed: Aug. 19, 2004

(65) Prior Publication Data

US 2009/0313526 A1 Dec. 17, 2009

(51) Int. Cl.
*H03M 13/00* (2006.01)
(52) U.S. Cl. .................. 714/758; 714/768; 714/718
(58) Field of Classification Search ................ 714/758, 714/763, 764, 768, 48, 52, 718
See application file for complete search history.

(56) References Cited

U.S. PATENT DOCUMENTS

| 3,863,225 | A | * | 1/1975 | Preiss ......................... 710/244 |
| 4,058,851 | A |   | 11/1977 | Scheuneman |
| 4,139,148 | A |   | 2/1979 | Scheuneman et al. |
| 4,163,147 | A |   | 7/1979 | Scheuneman et al. |
| 4,520,439 | A |   | 5/1985 | Liepa |
| 4,531,213 | A |   | 7/1985 | Scheuneman |
| 4,779,232 | A | * | 10/1988 | Fukunaka et al. ...... 365/189.02 |
| 4,926,426 | A |   | 5/1990 | Scheuneman et al. |
| 5,463,644 | A |   | 10/1995 | Rodi et al. |
| 5,687,353 | A | * | 11/1997 | Chen et al. ................... 711/155 |
| 6,125,467 | A | * | 9/2000 | Dixon ......................... 714/763 |
| 6,208,184 | B1 | * | 3/2001 | Demicheli et al. .......... 327/161 |
| 7,116,602 | B2 | * | 10/2006 | Klein ......................... 365/222 |
| 7,281,091 | B2 | * | 10/2007 | Yamazaki ................... 711/118 |

* cited by examiner

*Primary Examiner*—Fritz Alphonse
(74) *Attorney, Agent, or Firm*—Richard J. Gregson; Hollingsworth & Funk LLC

(57) ABSTRACT

An apparatus and method for selectively deriving Error Correction Codes (ECCs) or other data integrity information for integration into merged data blocks. First data is merged into second data that is error-protected using an ECC generated by a coding algorithm. Bytes or other data units are identified in the first data to be merged into the second data. It is determined whether each of the check bits of the ECC will differ from its original state in response to merging the first and second data. The check bits of the ECC that have been determined to differ from their respective original states are modified to create a "merged ECC." The resulting data block includes the merged data and the merged ECC.

21 Claims, 8 Drawing Sheets

APPARATUS AND METHOD FOR MERGING DATA BLOCKS WITH ERROR CORRECTION CODE PROTECTION

FIELD OF THE INVENTION

The present invention relates generally to data processing, and more particularly to selectively deriving Error Correction Codes (ECCs) or other data integrity information for integration into merged data blocks.

BACKGROUND OF THE INVENTION

Maintaining data integrity is essential to the efficacy of computing systems ranging from large-scale data processing systems to portable electronic devices. A transmission or storage error in even a single data bit can have a colossal impact on the intended use of the data or functionality of a computing system. Data corruption can be caused by any number of different factors associated with or otherwise influencing the data transaction, such as component or media failures, transmission line effects, electrical noise, poor connections, and the like.

To minimize the undesired consequences of data corruption, various manners of monitoring for data errors and ensuring data integrity have been implemented. Data errors can be detected using parity techniques, and in some cases may be corrected as in the case of Error Correction Code (ECC) methodologies. ECCs can be generated for a particular data block(s), and can be transmitted and/or stored with the data. Upon receipt or retrieval of the data block, the ECC code is regenerated using the same algorithm, and compared to the received or retrieved data to determine whether there is a disparity. If such a disparity exists, the data can in many cases be corrected, thereby obviating the need to retransmit the data or replace stored data.

Despite the ability and need to ensure data integrity, implementation of these error detection and correction techniques carries a price. The transmission of an ECC displaces the transmission of other relevant data, and requires generation and processing of the codes. This overhead can adversely impact system throughput and consume valuable processing resources. Therefore, while the importance of ensuring data integrity is arguably paramount to the issue of error detection/correction overhead, this overhead must be properly managed to minimize any resulting negative impact on system performance. Furthermore, while some overhead may be inevitable, it is important that the time and resources expended in generating the ECC is fruitful, and that fault isolation is as accurate as possible.

One data processing operation that is vulnerable to ECC inefficiencies and/or imprecision in isolating the source of data errors involves the merging of data. Merging one block of data into another can in and of itself increase efficiency and throughput. More particularly, data block sizes continue to increase, largely due to unremitting need to increase data throughput and the corresponding technological advances permitting it. Where the 8-bit byte was once the standard, 64-bit words and larger data blocks are now the norm. Sixty-four bit data buses now facilitate the collective storing of eight bytes, which in the previous 8-bit world would require eight separate data transactions. Notwithstanding the benefits of larger data block sizes, it is often the case that only a portion of a large stored data block needs to be modified. In such cases, it is desirable to "merge" one data block into another, creating a resulting data block that is only partially modified. For example, only a portion (e.g., one or more bits, nibbles, bytes, etc.) of a byte, word, cache line or other data block may change, whereby only a portion of the cache line may need to be updated in the cache or other storage module. By allowing such merge functions, an entire cache line or other data block does not need to be rewritten to the cache or other memory when only a portion of the data has changed.

Where the original data blocks being merged include ECCs, the resulting data block must also include an ECC to retain the desired error detection/correction facilities. As alluded to above, throughput inefficiencies, as well as an inability to accurately isolate the source of data errors, may be experienced in the creation of an ECC for the resulting merged data block. A current manner in which ECCs are provided for merged data is to recalculate the entire ECC of the resulting data block, following the merge operation. For example, an ECC is calculated for both data blocks of the merger, the data is merged, and then a resulting ECC is calculated. However, because a new ECC is calculated after the data is merged, there is no way to verify that data corruption was not introduced during the merge operation itself. Errors resulting from the merge operation are not detected in connection with the merge operation, and fault isolation objectives may be frustrated.

Accordingly, it would be desirable to provide a manner for addressing the aforementioned and other shortcomings of the prior art. The present invention fulfills these and other needs, and provides an apparatus and method for providing efficient and accurate error detection/correction for use in connection with data merging operations.

SUMMARY OF THE INVENTION

To overcome limitations in the prior art described above, and to overcome other limitations that will become apparent upon reading and understanding the present specification, the present invention discloses a method and apparatus for selectively deriving Error Correction Codes (ECCs) or other data integrity information for integration into merged data blocks.

In accordance with one embodiment of the invention, an apparatus is provided for merging first and second data block. The first data block includes first data, and the second data block includes second data and an original ECC having a plurality of ECC check bits. The first data block may optionally include an ECC as well. The apparatus includes a data unit enable module to identify data units of the first data to be merged into corresponding data units of the second data. A data merge module is arranged to merge the identified data units of the first data into the corresponding data units of the second data to create merged data. The apparatus also includes an ECC merge module, which includes a plurality of check bit generation modules. Each of the check bit generation modules includes circuitry to determine whether a state of a respective one of the ECC check bits differs from its original state in the original ECC, where this difference is a result of merging the identified data units. Each check bit generation module further includes circuitry for establishing a respective "revised" ECC check bit based on whether the respective ECC check bit differs from its original counterpart. The revised ECC check bits from the multiple check bit generation modules collectively provide a merged ECC for use with the merged data.

In accordance with another embodiment of the invention, an apparatus is provided for merging a first data block including first data, and a second data block including second data and an original ECC having a plurality of ECC check bits. The apparatus includes a merging circuit for merging one or more data units of the first data into corresponding data units of the second data to create the merged data. The apparatus includes circuitry to determine whether one or more check bits of the original ECC will change as a result of merging the data units of the first data into the second data. Circuitry is provided for modifying one or more of the check bits of the original ECC to produce a modified ECC for the merged data, where the modification is provided in response to determining that a corresponding one or more of the check bits of the original ECC will change.

In accordance with another embodiment of the invention, a method is provided for merging first data of a first data block into second data of a second data block, where the second data block includes multiple check bits generated according to a coding algorithm which forms an ECC for the second data. The method involves specifying at least one data unit of the second data to be replaced by a corresponding data unit(s) of the first data. It is determined, as a function of the coding algorithm, whether each of the check bits of the ECC will differ from its respective original state upon replacing the specified data units of the second data. The check bits of the ECC that have been determined to differ from their respective original states are modified, thereby creating a merged ECC. The specified data units of the second data are replaced with the corresponding data units of the first data to create the merged data, and a resultant data block is created that includes the merged data and the merged ECC.

According to yet another embodiment of the invention, an apparatus is provided for updating one or more check bits of an ECC associated with reference data, where this updating is performed in response to merging at least some of a modifying data segment into the reference data. The apparatus includes a data unit enable module configured to store multiple enable bits, one for each of a number (N) of data units associated with the reference data. The enable bits include one or more active enable bits identifying data units of the modifying data to be merged with the reference data. A plurality of check bit generation modules are provided, one for each of the check bits of the ECC associated with the reference data. Each of the check bit generation modules includes a gating array, and first, second and third stage arrays. The first stage array receives a set of corresponding data bits of the modifying data and the reference data according to a coding algorithm used to generate the reference data ECC. The first stage array outputs N change indications, each indicating whether merging the data unit(s) of modifying data with the reference data for a respective one of the N data units warrants a change in the check bit. The gating array is coupled to the first stage array to receive the N change indications, and is further coupled to the data unit enable module to receive the enable bits. The gating array allows change indications associated with the active enable bits to be passed, while blocking or otherwise disregarding change indications associated with enable bits that are not active. A second stage array is coupled to the gating array to receive the change indications passed by the gating array, and is arranged to generate a collective change indication. A third stage array receives the collective change indication as well as a corresponding one of the ECC check bits, and modifies the corresponding check bit of the ECC based on the collective change indication.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described particular, representative embodiments of the present invention.

BRIEF DESCRIPTION OF THE DRAWINGS

The invention is described in connection with the embodiments illustrated in the following diagrams.

DETAILED DESCRIPTION

In data processing systems, it is often beneficial to selectively modify portions of a data block, rather than to update the entire data block. This is particularly beneficial where only a portion of the subject data block requires modification, and updating the entire data block is more time consuming and/or computationally intensive than updating only those portions of the data block that have changed. One manner for performing such selective modification of a data block is referred to as a "merge" function, which generally involves combining at least two sets of data in a particular fashion into one set of data. For example, data may be merged in connection with a memory write function in which only selected portions of the data block are modified.

Where the data blocks to be merged are associated with an Error Correction Code (ECC), the ECC needs to be recalculated because the resultant data has likely changed. As previously indicated, prior merging methodologies determine the proper ECC for the resultant data by recalculating the ECC after the resultant data has been formed as a result of the merge function. Not only does it require additional processing time to compute this resultant ECC, there is no way to verify that data corruption is not introduced during the merge function itself.

The present invention is generally directed to merging ECC-protected data. In accordance with the invention, the ECCs that are associated with the merged data blocks are also merged. Rather than first merging the data blocks and recalculating the ECC for the resultant data block, the ECCs associated with the subject data blocks are also merged, whereby the resulting merged data is associated with a newly updated or "merged" ECC at once. In this manner, recalculation of an entire ECC for the resultant data is not required, and detection and possible correction of errors introduced during the merge function can be achieved.

Figure 1:
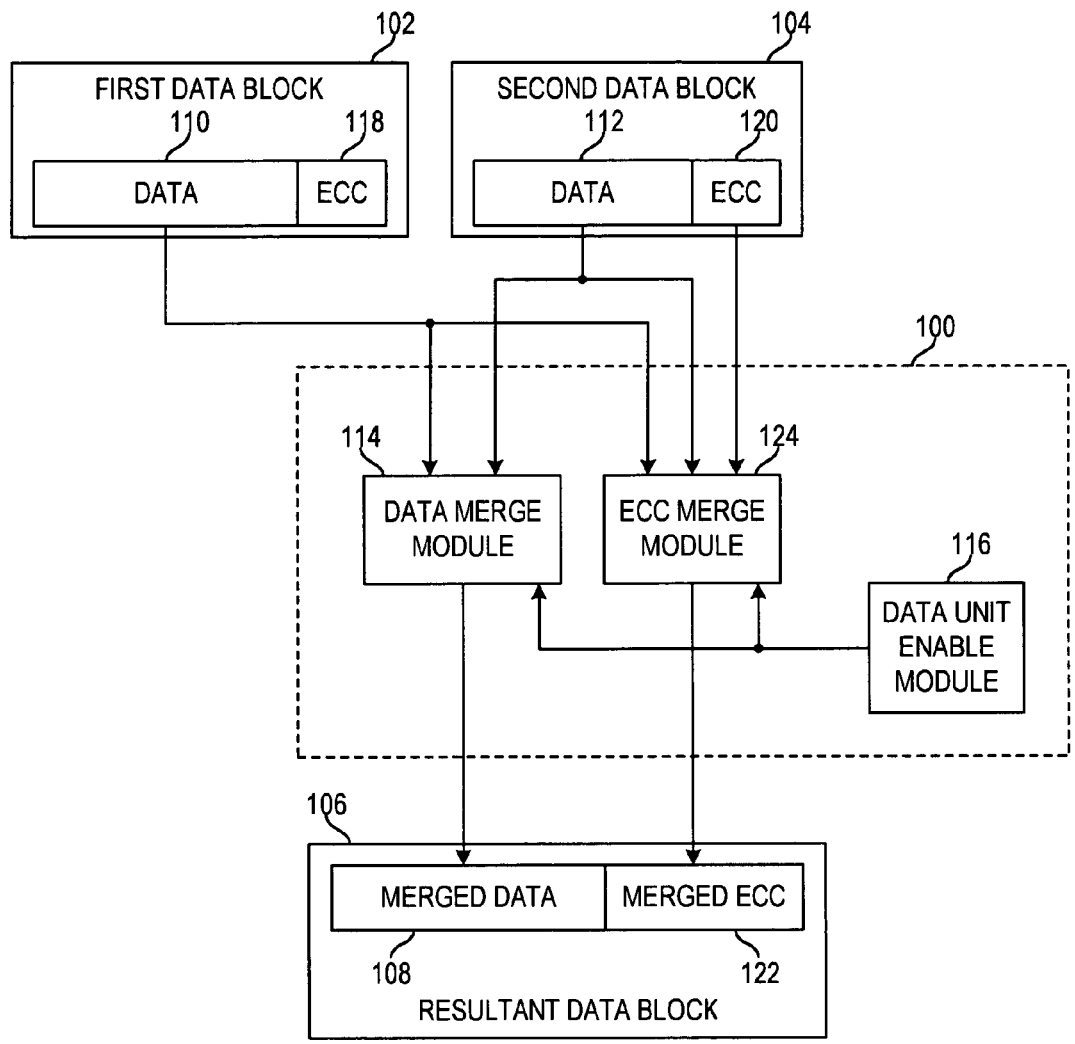
FIG. 1 is a block diagram illustrating one embodiment of an apparatus for merging multiple ECC-protected data blocks in accordance with the present invention.

FIG. 1 is a block diagram illustrating one embodiment of an apparatus 100 for merging multiple ECC-protected data blocks in accordance with the present invention. A first data block 102 and a second data block 104 are to be merged to produce a resulting data block 106. The first and second data blocks 102, 104 may be of any desired bit width. For example, each of the data blocks 102, 104 may include an 8-bit byte, multiple bytes, a cache line, or any other desired data size.

In order to create the merged data 108 associated with the resultant data block 106, the data 110 associated with the first data block 102 is merged with the data 112 associated with the second data block 104 via the data merge module 114. Merging in this sense refers to designating particular bits, nibbles, bytes, words, or other data units from the data 110, 112 of each of the first and second data blocks 102, 104 for inclusion in the merged data 108. More particularly, the data merge module 114 includes inputs to receive the data 110 and data 112, and the data unit enable module 116 is coupled to the data merge module 114 to identify which data units of the data 110, and which data units of the data 112 are to be selected for inclusion into the merged data 108 of the resultant data block 106.

In one embodiment, data is selected on a byte (i.e., eight bit) basis such that the data unit enable module 116 identifies particular bytes in each data segment 110, 112 to be included in the merged data 108. As a more particular example, assume that the data 110, 112 associated with each of the first and second data blocks 102, 104 includes eight bytes (i.e. bytes [0:7]). The data unit enable module 116 can designate, for example, bytes[0:1] from the data 110 to serve as bytes[0:1] in the merged data 108, and bytes[2:7] from the data 112 to serve as bytes[2:7] in the merged data 108. In this manner, selected data units from the data 110, 112 of each of the respective data blocks 102, 104 are used in the generation of the merged data 108 of the resultant data block 106.

As illustrated in FIG. 1, each of the first and second data blocks 102, 104 respectively includes an ECC 118, 120. Each ECC is comprised of a number of "check bits" (i.e., parity indicators). While merging data is relatively straightforward based on the state of the enable bits supplied by the data unit enable module 116, the check bits associated with each of the first and second data blocks 102, 104 are generated across multiple data units, and consequently the ECCs 118, 120 cannot be directly merged. In other words, the ECC 118 may be generated based on all data 110 associated with the first data block, and the ECC 120 may be generated based on all data 112 associated with the second data block. Therefore, directly merging the ECC 118 and ECC 120 would not produce an accurate ECC for the resultant data block 106, as it would not be based on the collective merged data 108.

A prior art solution involves generating an entirely new ECC based on this collective merged data 108. As previously indicated, such a solution fails to address the situation where data corruption occurs during the data merge operation itself. Where an ECC is recalculated based exclusively on the merged data 108, errors caused in connection with the merge operation cannot be detected or corrected.

The present invention addresses these problems, and merges an appropriately modified ECC, depicted as the merged ECC 122, into the resultant data block 106. The ECC merge module 124 uses the ECC from one of the data blocks as a "reference ECC" (ECC 120 from the second data block 104 in the illustrated embodiment), and modifies this ECC 120 to produce the merged ECC 122. The data associated with the reference ECC 120 is the "reference data" (data 112 in the illustrated embodiment) to which changes will be measured, and the other data 110 becomes the "modifying data" or new data. The ECC merge module 124 generates the merged ECC 122 based on at least the state of change of the reference data 112 by the modifying data 110 for data units specified by the data unit enable module 116, as well as the state of change of the reference ECC 120. More particularly, the data unit enable module 116 specifies which data units of the reference data 112 are being changed by the modifying data 110. Based on this information, the ECC merge module 124 modifies the check bits associated with the reference ECC 120 to produce the merged ECC 122 which can be directly merged into the resultant data block 106. The resulting merged ECC 122 can identify a data error caused during the merge process. Representative examples of the manners in which the ECC merge module performs the aforementioned functions is described in further detail below.

Figure 2:
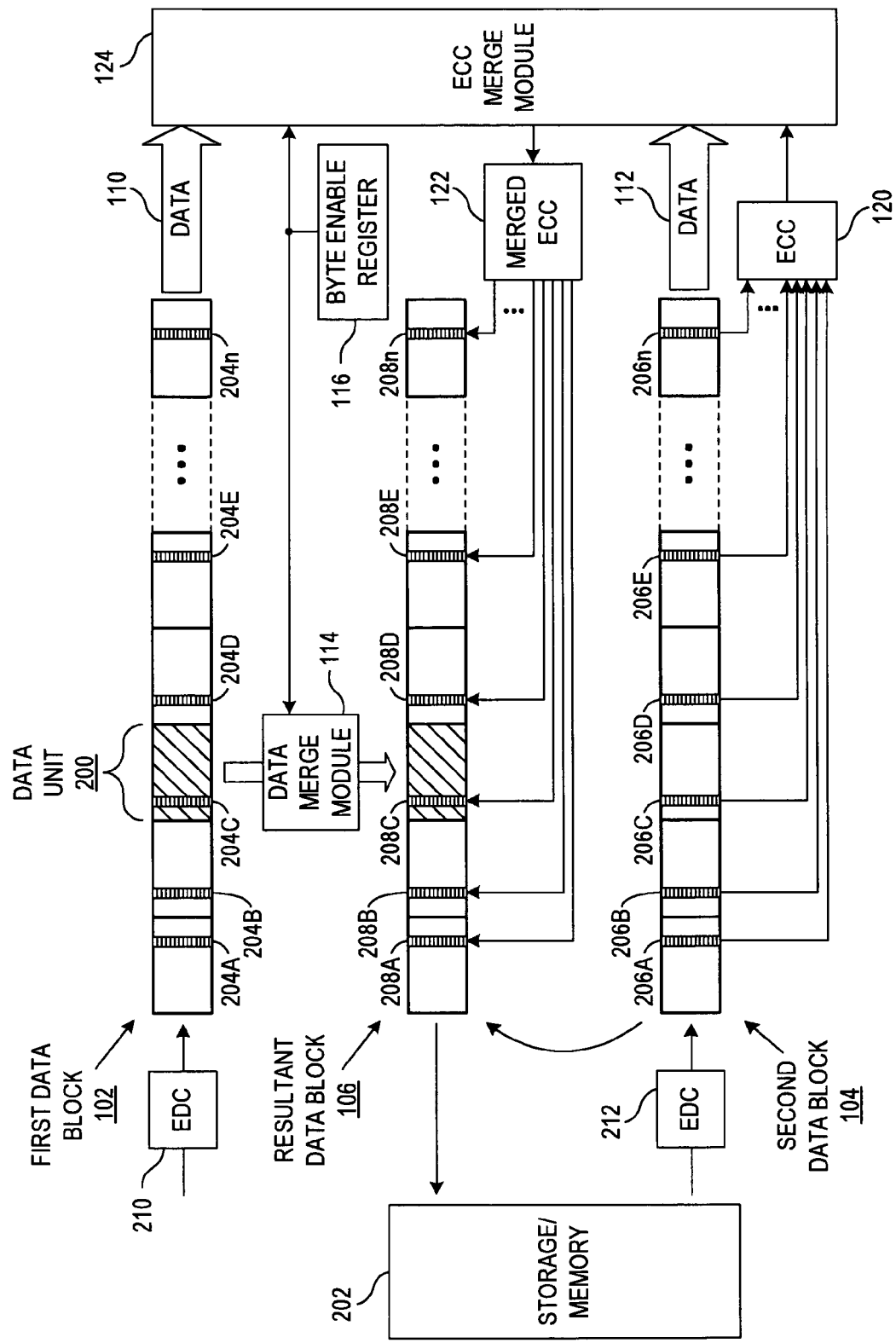
FIG. 2 is a block diagram illustrating a more particular example of a merge operation involving the merging of data and ECC in accordance with the present invention.

FIG. 2 is a block diagram illustrating a more particular example of a merge operation involving the merging of data and ECC in accordance with the present invention. In the illustrated embodiment, the first data block 102 includes a plurality of data units 200 which may represent bits, nibbles, bytes, etc. The second data block 104 is the reference data in the illustrated embodiment, i.e., the data to which changes will be measured. The second data block 104 may be stored in at least one memory, storage device, register, or other data storage element as depicted by the storage/memory 202. It should be noted that the second data block 104 need not be stored in such a storage/memory 202, as it may be transmitted or otherwise generated prior to storage.

The example of FIG. 2 involves merging the first data block 102 into the second data block 104 to ultimately form the resultant data block 106. Any number of bits may be merged from the first data block 102 into the second data block 104 to form the resultant data block 106. For ease of description, it is assumed for purposes of the description of FIG. 2 that data is merged on a byte basis, and that the data unit 200 represents a byte of data. It is also assumed that one byte 200 from the first data block 102 is to be merged into the second data block 104 to form the resultant data block 106. The data unit enable module 116 in the illustrated embodiment is embodied as a byte enable register, where the state of the byte enable register specifies which of the bytes of data 110 the first data block 102 will be merged into the data 112 of the second data block 104 by the data merge module 114.

The first data block 102 may include an ECC 118 (see FIG. 1), represented by a plurality of check bits 204A-204n. The ECC 118 may be provided as a discrete group of check bits, such as an ECC byte or word, which is then transmitted and/or stored with its associated data. Alternatively, the check bits of the ECC 118 may be included anywhere within the data, where a data object includes both the ECC 118 and its associated data. In the illustrated embodiment, the check bits 204A-204n are interspersed throughout the first data block 102. Similarly, the second data block 104 includes a plurality of interspersed check bits 206A-206n that form the reference ECC 120. In either case, the ECC check bits may alternatively be provided as a byte of ECC check bits or otherwise, as the particular placement of ECC check bits relative to their respective data bits is not of significance to the invention.

The ECC merge module 124 receives the data 110 from the first data block 102, the data 112 from the second data block 104, the byte enable bits from the byte enable register 116, and the check bits 206A-206n that form the reference ECC 120. In response, the ECC merge module 124 generates the merged ECC 122, which includes a plurality of check bits 208A-208n. Some or all of the check bits 208A-208n associated with the merged ECC 122 may change from the check bits 206A-206n of the reference ECC 120, which is a result of the new byte(s) 200 of data that was merged into the second data block 104 to form the resultant data block 106. In this manner, a new ECC 122, represented by check bits 208A-208n, is merged into the resultant data block 106.

It should be noted that the first data block 102 may be subjected to an error detection and correction (EDC) module 210 prior to being input to the data merge module 114 and ECC merge module 124. This ensures that the first data block does not exhibit data errors during its storage retrieval and/or transmission to the merge functionality. Similarly, the second data block 104 may be checked for errors via EDC module 212 prior to being input to the data merge module 114 and ECC merge module 124. The first data block 102 and/or the second data block 104 may be provided from a memory or other storage device (such as storage/memory 202), or may be provided to/from other circuitry.

Figure 3:
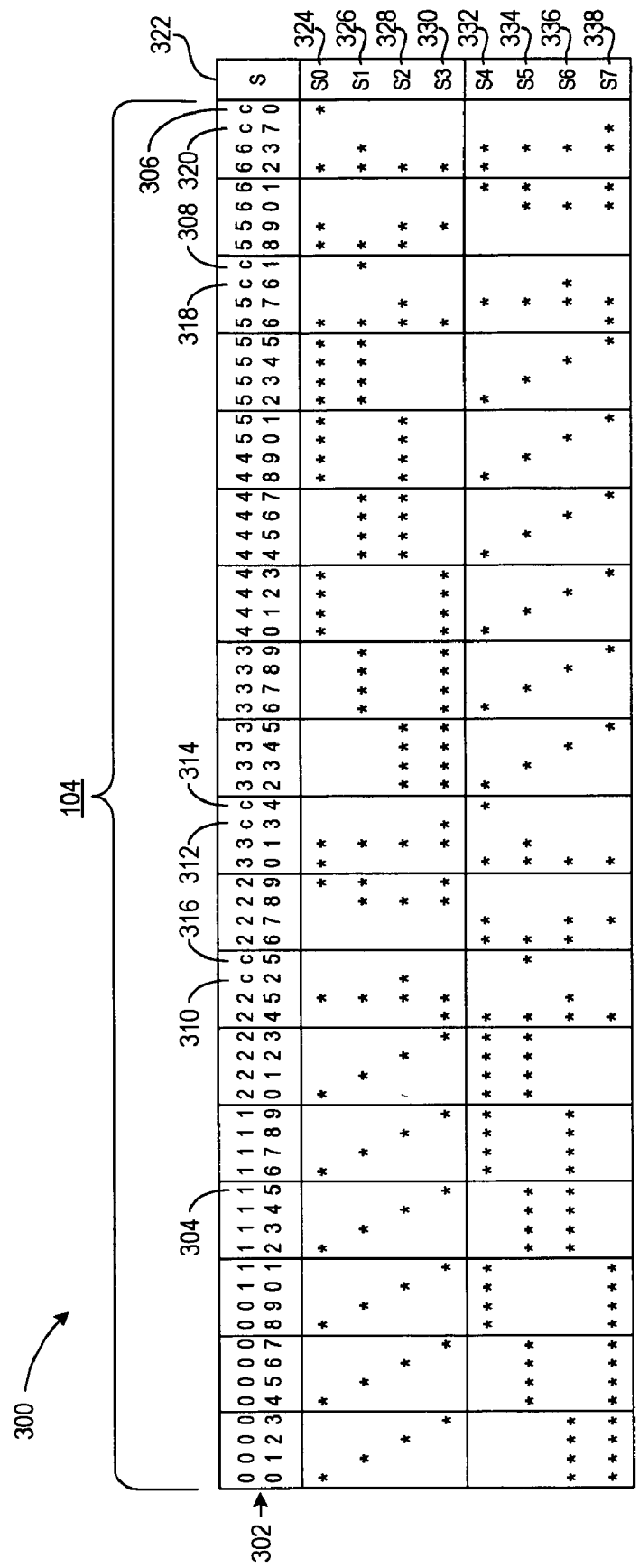
FIG. 3 is a table illustrating an exemplary syndrome coding algorithm which may be used in connection with the present invention.
Figure 4:
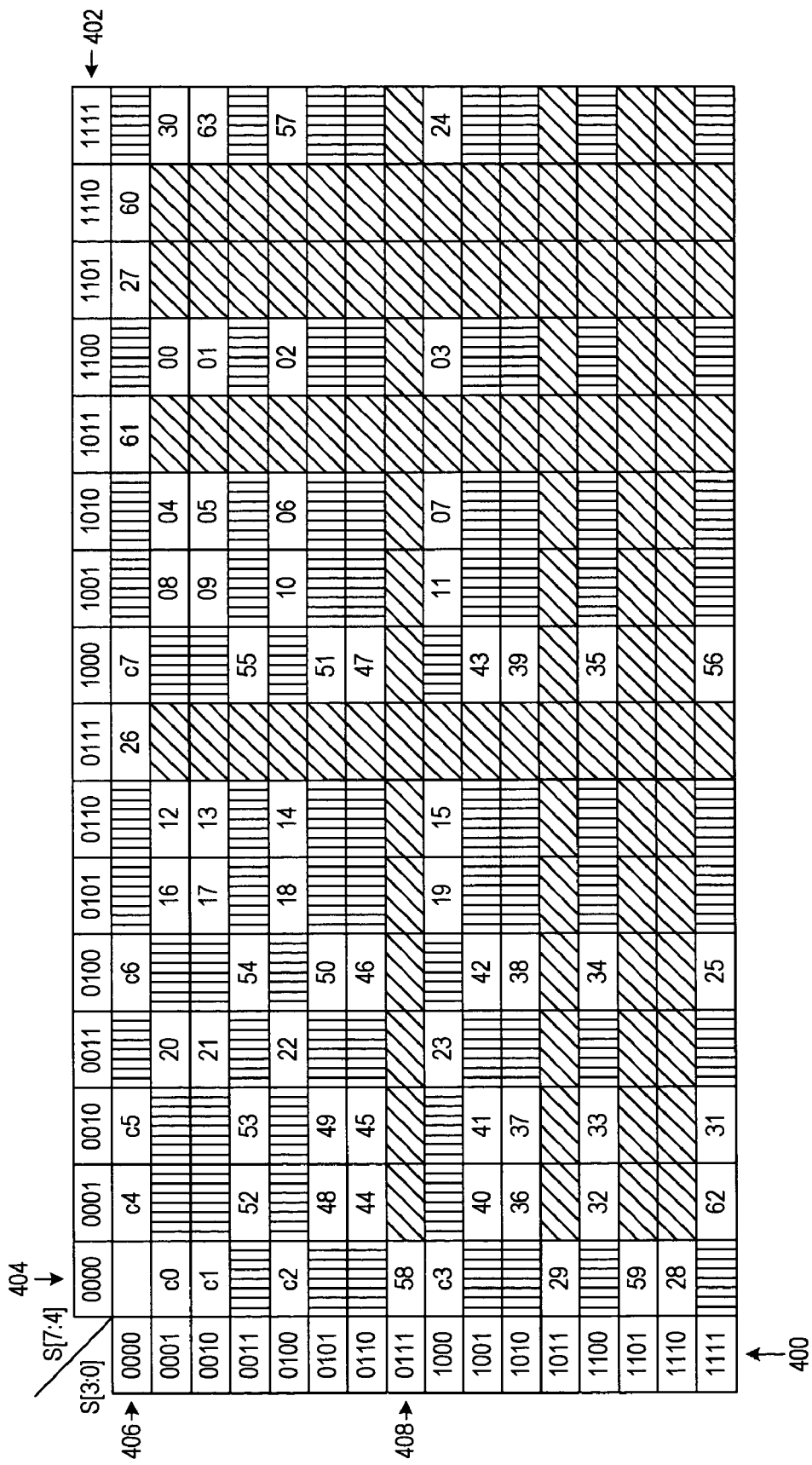
FIG. 4 is a table illustrating an exemplary manner of utilizing the syndrome code to identify data errors based on the state of the associated syndrome bits.

As previously indicated, the ECC merge module 124 creates a merged ECC 122 that is merged into the resultant data block 106. The ECC merge module 124 performs this function based on inputs including byte enable bits from the byte enable register 116, the reference ECC 120, and the data 110, 112 from the respective first and second data blocks 102, 104. In order to facilitate an understanding of the ECC merge module 124, an explanation is first provided for an ECC generation methodology operable in connection with the present invention. FIGS. 3 and 4 therefore illustrate a representative manner for generating syndrome bits from the ECCs, which assist in the detection and correction of data errors.

Referring now to FIG. 3, table 300 portrays a manifestation of an exemplary syndrome coding algorithm (hereinafter "coding algorithm") which may be used in connection with the present invention. It should be recognized that the coding algorithm depicted by the table 300 is provided merely as an example of one manner for generating a syndrome code which can be used to detect and possibly correct data errors. As will be readily apparent to those skilled in the art from the description provided herein, other coding algorithms may be analogously implemented for use in connection with the present invention.

A first row 302 represents the second data block 104, which includes the data 110 and ECC 120 shown in FIG. 1. Row 302 may also represent other data blocks, such as the first data block 102 shown in FIG. 1. In this example, the data includes sixty-four bits, and may be represented as data[0:63]. For example, data[15] represents data bit 304. An ECC, such as ECC 118 or ECC 120, includes a plurality of check bits C[0:7] which are interspersed throughout the data[0:63] in the illustrated embodiment. More particularly, the ECC associated with the second data block 104 includes C[0] 306, C[1] 308, C[2] 310, C[3] 312, C[4] 314, C[5] 316, C[6] 318, and C[7] 320.

A coding algorithm to generate a syndrome code 322 is represented by the data bits and check bits associated with each of the syndrome bits 324-338.

The syndrome code may be represented by S[0:7], where the syndrome bits S0 324, S1 326, S2 328, S3 330, S4 332, S5 334, S6 336 and S7 338 collectively represent S[0:7]. The algorithm uses predetermined data and check bits to formulate each of the syndrome bits. For example, the exemplary algorithm determines S0 324 by calculating the one-bit sum, without carry, of each of the following data bits: 00, 04, 08, 12, 16, 20, 25, 29-31, 40-43, 48-56, 58, 59, and 62 (hereinafter referred to as the relevant data bits for S[0] 324). An even or odd parity scheme is selected, and the check bit C[0] 306 is set such that the one-bit sum (without carry) of the relevant data bits for S[0] 324 and the check bit C[0] 306 results in a syndrome bit S0 324 that corresponds to the selected parity scheme. For example, assuming an even parity scheme, check bit C[0] 306 is selected such that the one-bit sum of the relevant data bits for S[0] 324 and the check bit C[0] 306 equals zero. A similar process occurs for each of the remaining syndrome bits S[1:7], which ultimately results in the creation of the syndrome code 322 having an initial value of zero (e.g., binary 0000 0000).

In this manner, the check bits C[0:7] are appropriately set within the data block 104 to form an ECC. When the data block 104 is subsequently received by a device, retrieved from memory, or otherwise accessed, the syndrome code 322 will again be calculated. If regeneration of the syndrome code 322 results in a value of zero (or other predetermined state of the syndrome code 322), then the data within the data block 104 is deemed valid due to the lack any discovered data errors. If any of the syndrome bits 324-338 do not correspond to the syndrome code 322 as originally generated, e.g., zero values, this indicates data errors.

FIG. 4 is a table illustrating an example of using the syndrome code 322 to identify data errors based on the state of the associated syndrome bits S[0:7]. When the data block having an ECC is received, the data therein is subjected to the same coding algorithm used to initially create the ECC for that data block. This results in the recreation of the syndrome code, where column 400 represents the state of syndrome bits S[3:0], and row 402 represents the state of syndrome bits S[7:4]. As previously indicated, an even parity scheme is assumed for purposes of the example of FIGS. 3 and 4, and therefore no data errors are present where all syndrome bits S[7:0] are zero (e.g., binary 0000 0000). This condition is shown at the intersection of column 404 and row 406.

In any other case, at least one syndrome bit is a binary one, thereby indicating at least one data error. According to the coding algorithm of the present example, if S[3:0] of column 400 has three set (e.g., "1") syndrome bits, and S[7:4] of row 402 has any set syndrome bits, then some nibble of data contains a three or four bit error. Similarly, if S[7:4] of row 402 has three set syndrome bits, and S[3:0] of column 400 has any set syndrome bits, then some nibble of data contains a three or four bit error. These cases are depicted by the row/column intersections having diagonal lines.

If the syndrome code S[7:0] collectively includes an odd number of set bits, then the error is a correctable, single bit error. These situations are indicated at the row/column intersections with a data or check bit identifier, which identifies the particular data or check bit that is corrupt. For example, if S[7:4] is 0000 as shown at column 404, and S[3:0] is 0111 as shown at row 408, then data[58] is corrupt. These single bit errors may be corrected.

For any other non-zero value of S[7:0], there is an uncorrectable error. These conditions are depicted by the row/column intersections having vertical lines. Again, it should be noted that different coding algorithms may be used, and the example of FIGS. 3 and 4 are provided for purposes of illustration only. For example, the use of a larger number of check bits in the ECC may allow for the detection and correction of multiple bit errors, and such an algorithm is equally applicable in connection with the present invention.

Figure 5:
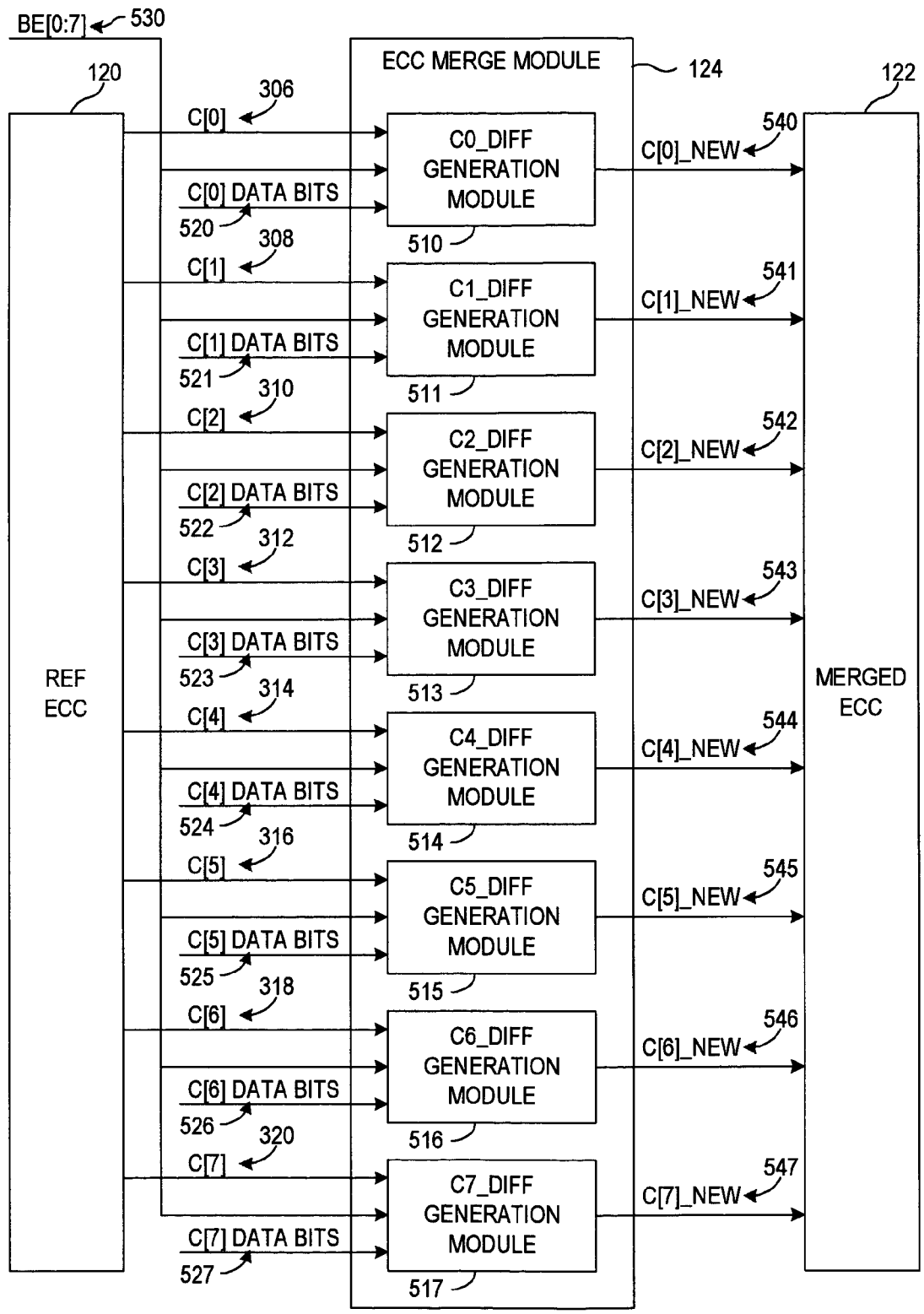
FIG. 5 is a block diagram illustrating one embodiment of an ECC merge module that creates a merged ECC.

The coding algorithm used to initially generate the ECC is also used in connection with the ECC merge functionality, as is now described in greater detail. FIG. 5 is a block diagram illustrating one embodiment of the ECC merge module 124 that creates the new "merged" ECC 122. The embodiment of FIG. 5 considers only the merging of the ECC, and not of the associated data. As was indicated in the embodiment of FIG. 1, the first data block 102 represents the modifying data 110 and modifying ECC 118, and the second data block 104 represents the reference data 112 and reference ECC 120. Either of the data blocks may be designated as the reference data/ECC, as this merely designates which of the data/ECC sets will be modified by the other.

Referring again to FIG. 5, the ECC 120 is illustrated as the reference ECC (Ref ECC), i.e. the ECC that will be modified by the ECC merge module 124 when the first and second data blocks 102, 104 are merged. The Ref ECC 120 includes eight check bits in the illustrated embodiment, which are designated as C[X] 306-320, where "X" represents check bits[0:7] as previously identified in FIG. 3. These check bits 306-320 represent the state of the Ref ECC 120 prior to the merge function. Each of the check bits 306-320 is provided to a respective check bit difference generation module, designated as CX_Diff Generation Module 510-517 where "X" again represents check bits[0:7].

Also input into each of the CX_Diff Generation Modules 510-517 are the respective "relevant data bits," which as described above represent the data bits used by the coding algorithm to initially establish the state of the check bits[0:7]. For example, the algorithm as shown in FIG. 3 utilizes data bits 00, 04, 08, 12, 16, 20, 25, 29-31, 40-43, 48-56, 58, 59, and 62 in the calculation of C[0] 306, where these data bits are referred to in FIG. 5 as the C[0] data bits 520. Accordingly, the generation of each of the check bits[0:7] includes respective "relevant data bits," shown as the C[X] data bits 520-527, where "X" represents check bits[0:7].

Each of the CX_Diff Generation Modules 510-517 also receives byte enable signals, illustrated as BE[0:7] 530. Eight such byte enable bits, generated by the data unit enable module 116 of FIG. 1, are provided in the illustrated embodiment. This is based on the assumption that data merging will occur on a byte basis, and at least the merged data 108 includes eight bytes. For data blocks of different sizes, or where data may be merged on boundaries different than a byte boundary, a different number of byte enable bits would be used. These BE[0:7] 530 bits may be implemented as bits or other data/signals, where some or all of the BE[0:7] 530 bits identify which of bytes of the C[X] data bits 520-527 will be used in the generation of each "new" check bit, C[X] New 540-547. Therefore, using the original check bits 306-320 of the Ref ECC 120, the C[X] data bits 520-527, and the BE[0:7] 530, the CX_Diff Generation Modules 510-517 of the ECC merge module 124 generate one or more new check bits C[X]_New 540-547 that form the merged ECC 122.

Figure 6A:
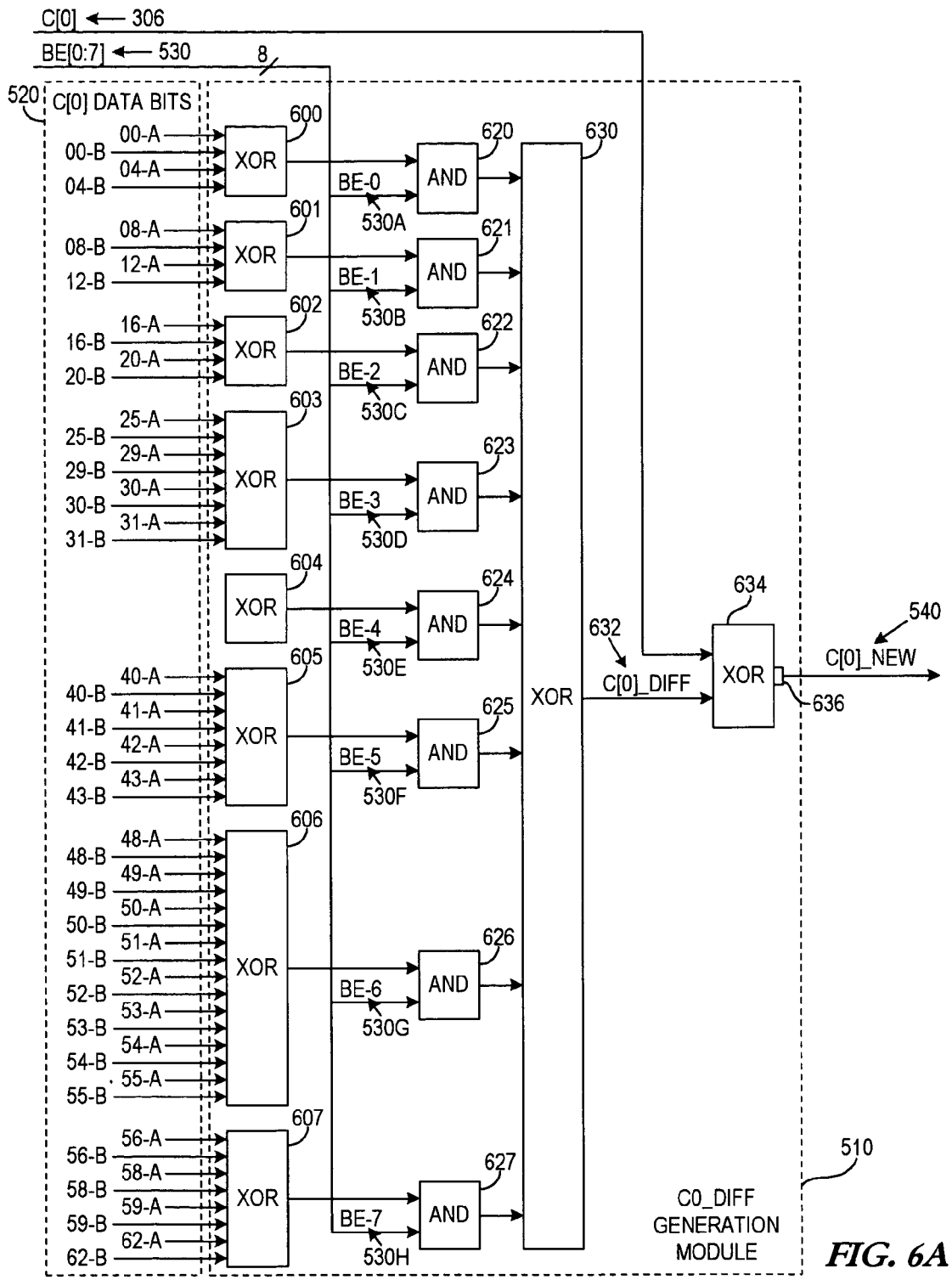
FIG. 6A illustrates a representative manner for generating a new check bit in accordance with one embodiment of the present invention.

FIG. 6A illustrates a representative manner for generating a new check bit, such as any of new check bits C[X]_New 540-547, in accordance with one embodiment of the present invention. The embodiment of FIG. 6A corresponds to the C0_Diff Generation Module 510 introduced in connection with FIG. 5 to generate the C[0]_New bit 540, but analogous circuitry may be used for each of the remaining CX_Diff Generation Modules 511-517 to generate their respective C[X]_New bits 541-547. From the description provided herein, those skilled in the art will appreciate the manner in which the remaining modules 511-517 may be implemented to develop the complete merged ECC 122.

Using the exemplary coding algorithm set forth in FIG. 3, each check bit is originally set such that the one-bit sum of the C[0] data bits 520 and the original check bit C[0] 306 results in a syndrome bit (S0 324) equal to zero, assuming an even parity scheme. The same C[0] data bits 520 are used to establish the new check bit C[0]_New 540. The byte enables BE[0: 7] 530 are used to identify which bytes of the newly formed resultant data block 106 will be different from the reference data block, which is the second data block 104 in the current example. BE[0:7] 530 are also used by the C0_Diff Generation Module 510 to identify which check bits associated with the resultant data block 106 will be changed. Finally, the original check bit C[0] 306 is also used in the generation of the corresponding C[0]_New check bit 540. In this manner, each of the check bits C[0:7] is modified, relative to its original state, by examining the data of the changing bytes.

Referring to FIGS. 3 and 6, the C[0] data bits 520 represent the data bits used in the formation of the syndrome bit S0 324, and check bit C[0] 306 represents the check bit that is used in the formation of S0 324. For each byte (or other designated data unit) of the data, the relevant data bits for S[0] 324 from the modifying and reference data (i.e., the data being merged) are compared. For example, the relevant data bits in the first byte 340 include data bits 00 and 04. Therefore, bits 00 from each of the modifying and reference data for byte 340 are compared to determine whether they differ, and bits 04 are also compared in this manner. This is shown in FIG. 6A where data bit 00-A and 00-B, representing corresponding data bits 00 342 from the modifying and reference data bytes respectively, are input into XOR 600. Similarly, data bit 04-A and 04-B, representing corresponding data bits 04 344 from the modifying and reference data bytes respectively, are also input into XOR 600. Thus, the data bits are compared on a byte basis, as the XOR 600 is used to determine whether a change exists in the corresponding relevant data bits for byte 340. This is performed for each of the bytes of the data word, where an XOR 600-607 is used to determine data changes in each of the bytes of the data word.

It should be noted that the XORs 600-607 are represented as multi-input XORS. In one embodiment, each of the XORs 600-607 is implemented as an XOR tree, such as depicted by XOR 600 in FIG. 6B. The first level 610 of the XOR tree includes parallel two-input XORs 612 to each receive its corresponding data bits from the modifying and reference data (e.g., 00-A and 00-B; 04-A and 04-B, etc.). The outputs of the first level XORs 612 are input into a second level 614 of XORs 616 if necessary, and so forth until a single result 618 is provided. Other equivalent manners for providing a multi-input XOR are known in the art, and may be used in connection with the present invention. The result 618 will indicate whether an odd or even number of corresponding relevant data bits from the modifying/reference data have changed. If an even number of corresponding relevant data bits change within the byte, then the XOR 600-607 output will indicate a first logic state, such as a binary zero, which is the same as if no data bits had changed within that byte. This is because an even number of corresponding relevant data bit changes will not impact the state of the check bit, C[0]_New 540. On the other hand, if an odd number of the corresponding relevant data bits change, the output of the XOR 600-607 will be set to a second logic state, such as a binary one, indicating a possible change in the C[0]_New 540.

More particularly, assume that a single byte, including data bits 00-07 forming byte 340, will be merged from a modifying data block into a reference data block. The relevant data bits of byte 340 for calculating C[0]_New 540 are 00 342 and 04 344, which are input into XOR 600 as shown in FIG. 6A. If 00-A does not differ from 00-B and 04-A does not differ from 04-B, the output of XOR 600 will indicate no change, i.e. a logic low or "0" for purposes of the present example. If 00-A is different than 00-B and 04-A is different than 04-B, the output of XOR 600 will also indicate no change, since an even number of changes occurred which will not impact the state of the check bit C[0]_New 540. On the other hand, if either 00-A is different than 00-B or 04-A is different than 04-B, the output of XOR 600 will indicate a change, as an odd number of changes occurred. The result is provided to a corresponding gate, such as AND gate 620. If this particular byte 340 is a byte subject to the merge function, which it is in the present example, then the corresponding byte enable bit BE-0 530A will pass the XOR 600 result to a second XOR stage represented by XOR block 630. This occurs for each byte of the data, where the relevant data bits for the respective check bit are provided to a corresponding XOR 600-607, the results of which are gated using respective gates 620-627 and byte enable bits 530A-530H.

Figure 6B:
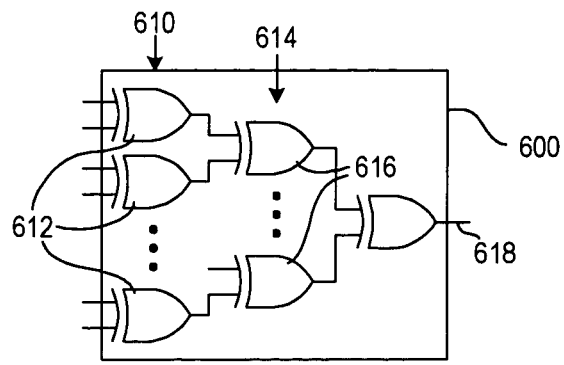
FIG. 6B illustrates a representative multi-input exclusive-OR (XOR) that is implemented as an XOR tree.

The XOR block 630 may also be implemented using an XOR tree such as described in connection with FIG. 6B, or using analogous multi-input XOR mechanisms. The XOR block 630 determines whether the check bit in question has changed from its original state. For example, if only one byte 340 is being merged, then only BE-0 530A will be active, and AND gate 620 will pass the result of XOR 600. If an odd number of data bit changes occurred at the input of XOR 600, then a change indicator (e.g., binary one) will be output from XOR 600, passed through AND gate 620, and presented as an input to the XOR block 630. Since in this example BE-0 530A is the only byte enable active, the XOR block 630 will recognize a change in only one byte, i.e. the byte 340 associated with XOR 600. This will produce a C[0]_Diff 632 signal. If the C[0]_Diff 632 signal is a first state (e.g., "0"), it indicates an even number of changes, and if it is a second state (e.g., "1") it indicates an odd number of changes.

The C[0]_Diff 632 signal therefore indicates whether the original check bit C[0] 306 will change from its original state. The XOR 634 receives the C[0]_Diff 632 and C[0] 306 bits, and generates the new check bit, C[0]_New 540, in response. More particularly, if C[0]_Diff 632 indicates that the check bit C[0] 306 has changed from its original state, the XOR 634 performs the actual change of state of the original check bit C[0] 306, and outputs the result via an output 636 of the XOR 634. In this manner, C[0]_New 540 will be different from the original check bit C[0] 306 if the number of changes in the relevant data bits warrants the change. Otherwise, C[0]_New 540 will remain the same.

Using the respective relevant data bits and BE[0:7] bits, each of the CX_Diff Generation Modules 510-517 will generate a respective C[X]_New 540-547. The resulting C[X] _New 540-547 forms the merged ECC 122, as shown in FIG. 5.

Figure 7:
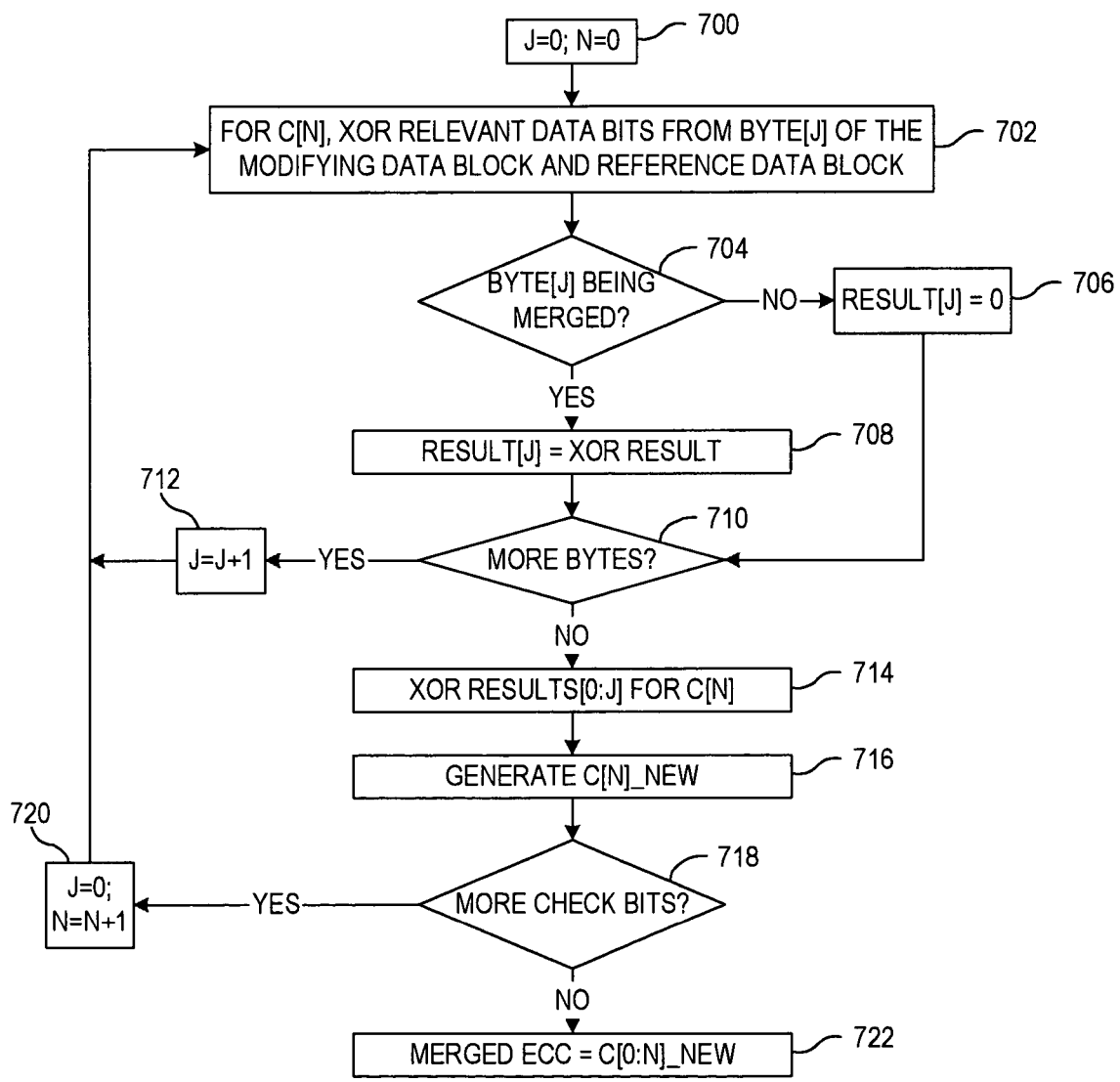
FIG. 7 is a flow diagram illustrating one manner for merging ECCs from merged data blocks in accordance with the present invention.

FIG. 7 is a flow diagram illustrating one manner for merging ECCs from merged data blocks in accordance with the present invention. The number of check bits, as well as the number of bytes or other data units that are associated with the merged data blocks, may vary in accordance with the present invention. For purposes of example, it is again assumed that merging is performed on a byte basis, although this too may vary. It is also noted that while the flow diagram of FIG. 7 is generally illustrated as a sequential series of operations, various operational functions may be performed in parallel, and the sequential nature of FIG. 7 is provided for purposes of explanation only.

In this example, the particular check bit of the reference ECC 120 that is being considered will be denoted C[N], where N represents the total number of check bits in the ECC 120. Further, as discussed in connection with FIG. 6A, the merge may be performed on a byte basis, and the data bits being merged includes a plurality of bytes. The particular byte being considered will be denoted BYTE[J], where J represents the total number of bytes in the resulting data block 106.

To consider the first BYTE[0] of the first check bit C[0], J and N are 0 as shown at block 700. For C[0], the relevant data bits from BYTE[0] of the modifying and reference data blocks are exclusive-OR'ed (XOR'ed) as shown at block 702. For example, the first byte (BYTE[0]) of relevant data bits associated with C[0] 306 shown in FIG. 3 includes data bits 00 and 04. Therefore, data bits 00 and 04 from the modifying and reference data blocks 102, 104 are XOR'ed 702. It is determined 704 whether BYTE[0] is being merged, which can be determined from the BE bits for example. If not, the RESULT[0] can be set to zero as shown at block 706, or can be set to another predetermined value or disregarded. If it is determined 704 from the BE bits that BYTE[0] is being merged, the RESULT[0] equals the result of the XOR function 702, as indicated at block 708. It is determined 710 whether more bytes are included in the resulting data block, and if so the next byte is considered as depicted by incrementing J at block 712. Thus, for C[0], the relevant data bits from BYTE[1] of the modifying and reference data blocks are XOR'ed 702. This continues until all J of the bytes have been considered, as determined at decision block 710.

When all of the bytes for the particular check bit C[0] have been considered, the RESULTS[0:J] are XOR'ed 714. More particularly, results from blocks 706, 708 represent the XOR 702 results, performed on a byte basis, for C[0]. The result of the XOR 714 indicates whether there is a change from the original check bit C[0] due to the merge function, in which case a new check bit C[0]_New is generated 716. At this point, the first check bit C[0]_New of the merged ECC 122 has been determined.

It is determined 718 whether more check bits are associated with the ECC. In the present example, seven additional check bits, C[1:7] still need to be determined. Therefore, J is reset (e.g., cleared to zero), and N is incremented as shown at block 720. This allows the next check bit, C[1], to be considered. Then, for C[1], the relevant data bits from BYTE[0] of the modifying and reference data blocks are XOR'ed as shown at block 702. For example, the first byte (BYTE[0]) of relevant data bits associated with C[1] 308 shown in FIG. 3 includes data bits 08 and 12, which are then XOR'ed 702. Again each of the bytes is considered, and results 706, 708 are determined for each byte. When all bytes for C[1] have been considered as determined at decision block 710, the RESULTS[0:J] for C[1] are XOR'ed 714, and the C[1]_New is generated 716. This continues until each of the check bits C[0:N]_New has been determined, resulting in the merged ECC as shown at block 722.

Figure 8:
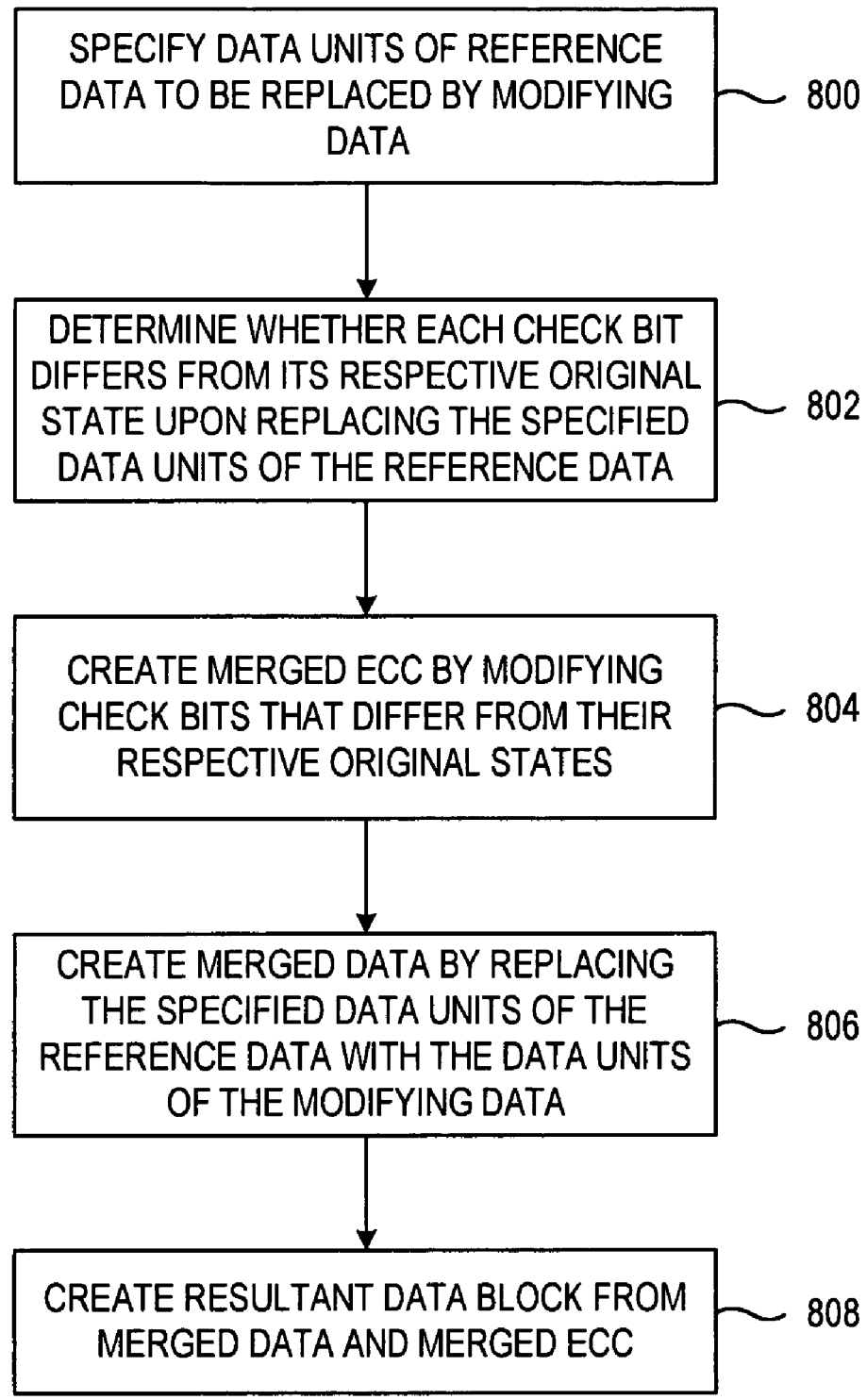
FIG. 8 is a flow diagram illustrating an embodiment of a method for modifying an ECC associated with reference data as a result of merging the modifying data into the reference data.

FIG. 8 is a flow diagram illustrating an embodiment of a method for modifying an ECC associated with reference data as a result of merging the modifying data into the reference data. One or more data units of the reference data are specified 800 to be replaced by the modifying data. For example, particular nibbles, bytes, words, or other data units may be specified by the data unit enable module, where these data units are then subject to being replaced by corresponding data units from the modifying data. It is determined 802 whether each check bit differs from its respective original state upon replacing the specified data units of the reference data. For example, for a given check bit, it is determined whether that check bit may be affected due to the reference data being changed by the modifying data. In one embodiment, this is performed on a byte basis such that corresponding bits of each byte of the modifying and reference data are compared, where the corresponding bits for a particular check bit determination are those identified by the coding algorithm that was used to originally generate the ECC for the reference data.

Based on whether the merged data causes a difference in the check bit from its original state, the actual check bits are modified accordingly to produce the merged ECC, as shown at block 804. For example, if it is determined that the data merge results in a change to a first check bit C[0], then C[0] is changed from its original state to the new state C[0]_New. As a more particular example, if it is determined that the data merge results in a change to a first check bit C[0] whose original logic state was "0", then C[0] is modified to a new logic state "1".

Merged data is created 806 by replacing the specified data units of the reference data with the data units of the modifying data. For example, if bytes 0 and 1 are specified, bytes 0 and 1 of the modifying data are used to replace bytes 0 and 1 of the reference data. The resulting "merged" data then includes bytes 0 and 1 of the modifying data, and the remaining bytes (e.g., 2-7 for a 64-bit word) include those associated with the reference data. The resultant/merged data block then includes the merged data and the merged ECC, where the merged ECC conforms to the coding algorithm for the newly merged data, without having to calculate an entire ECC based on the merged data.

Using the foregoing description, the invention may be implemented as a machine, process, or article of manufacture by using standard programming and/or engineering techniques to produce programming software, firmware, hardware or any combination thereof. The description of the exemplary embodiments of the invention has been presented for the purposes of illustration and description. It is not intended to be exhaustive or to limit the invention to the precise form disclosed. Many modifications and variations are possible in light of the above teaching. For instance, it would be apparent from the description provided herein that operation of the XOR, AND, or other logic gates can be implemented using a variety of alternative forms including, among others, mathematically-equivalent logic gates, programmed controllers and the like. The scope of the invention should therefore not be limited by the representative embodiments set forth above, but rather determined from the claims appended hereto.

What is claimed is:

1. An apparatus having a computer-readable medium encoded with instruction executed within the apparatus for merging a first data block including first data, and a second data block including second data and an original Error Correction Code (ECC) having a plurality of ECC check bits, the apparatus comprising:
   a data unit enable module to identify data units of the first data to be merged into corresponding data units of the second data;
   a data merge module arranged to merge the identified data units of the first data into the corresponding data units of the second data to create merged data; and
   a plurality of check bit generation modules each comprising means for determining whether a state of a respective one of the ECC check bits differs from its original state in the original ECC in response to merging the identified data units, and for establishing a respective revised ECC check bit based on the determination, wherein the respective revised ECC check bits from the plurality of check bit generation modules collectively provide a merged ECC for the merged data.

2. The apparatus as in claim 1, wherein each of the check bit generation modules respectively comprises an output to provide its respective revised ECC check bit, and wherein the outputs from each of the check bit generation modules collectively provides the merged ECC.

3. The apparatus as in claim 1, wherein the means for establishing a revised ECC check bit based on the determination comprise means for changing the state of the respective one of the ECC check bits if it is determined that the respective one of the ECC check bits differs from its original state in the original ECC as a result of the merging of the identified data units.

4. The apparatus as in claim 1, wherein the means for determining comprise means for identifying differences in corresponding data bits, as a function of a coding algorithm used to generate the original ECC, for each data unit of the first and second data.

5. The apparatus as in claim 4, wherein the means for identifying differences in corresponding data bits comprise a first stage of exclusive-OR modules to identify the differences in corresponding data bits.

6. The apparatus as in claim 4, wherein the means for determining further comprise:
   a plurality of gates each coupled to the first state of exclusive-OR modules to enable passage of only the identified differences in corresponding data bits from the data units identified by the data unit enable module; and
   a second stage exclusive-OR module coupled to the plurality of gates to receive the identified differences that have been passed by the plurality of gates, and to generate a check bit difference indicator in response thereto.

7. The apparatus as in claim 6, wherein the means for determining further comprise an output gate coupled to the second stage exclusive-OR and coupled to receive a respective one of the check bits from the original ECC, and to establish the respective revised ECC check bit based on the check bit difference indicator.

8. The apparatus as in claim 7, wherein the output gate comprises an exclusive-OR gate coupled to the second stage exclusive-OR and coupled to receive the respective one of the check bits from the original ECC, wherein the output gate is configured to toggle the respective one of the check bits from the original ECC to establish the respective revised ECC check bit if the check bit difference indicator indicates an odd number of the identified differences that have been passed by the plurality of gates.

9. The apparatus as in claim 6, wherein each of the plurality of gates is coupled to the data unit enable module to respectively receive one of a plurality of data unit enable signals indicative of whether passage of the identified differences in corresponding data bits is enabled.

10. The apparatus as in claim 1, wherein the data unit enable module comprises a register storing a plurality of enable bits, each enable bit corresponding to one of the data units to identify the data units of the first data to be merged into corresponding data units of the second data.

11. An apparatus having a computer-readable medium encoded with instruction executed within the apparatus for merging a first data block including first data, and a second data block including second data and an original Error Correction Code (ECC) having a plurality of ECC check bits, the apparatus comprising:
   merging means for merging one or more data units of the first data into corresponding data units of the second data to create merged data;
   determining means for determining whether one or more of the check bits of the original ECC will change as a result of the merging of the one or more data units of the first data into the second data; and
   modifying means coupled to the determining means for modifying one or more of the check bits of the original ECC to produce a modified ECC for the merged data, in response to a determination by the determining means that a corresponding one or more of the check bits of the original ECC will change.

12. The apparatus as in claim 11, wherein the determining means comprises comparing means for comparing corresponding data bits of the first and second data on a data unit basis and as a function of a coding algorithm used to generate the original ECC, and for identifying each of the check bits that will change.

13. The apparatus as in claim 12, wherein the modifying means comprises means for toggling a state of the check bits that have been identified to change by the comparing means.

14. A method having a computer-readable medium encoded with instruction executed within a programmable computer for merging first data of a first data block into second data of a second data block, the second data block including a plurality of check bits generated according to a coding algorithm and forming an Error Correction Code (ECC) for the second data, the method comprising:
    specifying one or more data units of the second data to be replaced by a corresponding one or more data units of the first data;
    determining, as a function of the coding algorithm, whether each of the check bits of the ECC will differ from its respective original state upon replacing the specified data units of the second data;
    modifying the check bits of the ECC that have been determined to differ from their respective original states to create a merged ECC;
    replacing the specified data units of the second data with the corresponding one or more data units of the first data to create merged data; and
    creating a resultant data block including the merged data and the merged ECC.

15. The method of claim 14, wherein specifying one or more data units comprises providing a plurality of enable bits, one for each of the data units of the second data, and asserting a respective one of the enable bits for each of the one or more data units of the second data to be replaced by a corresponding one or more data units of the first data.

16. The method of claim 14, wherein determining whether each of the check bits of the ECC will differ from its respective original state comprises:
    for each of the check bits, comparing a respective subset of corresponding data bits of the first and second data as dictated by the coding algorithm, and in response providing respective data unit change indications; and
    for each of the check bits, generating a check bit change indication based on the data unit change indications associated with the data units of the second data that are specified to be replaced, wherein the check bit change indication indicates whether the respective one of the check bits will differ from its respective original state upon replacing the specified data units of the second data.

17. The method of claim 16, wherein generating a check bit change indication comprises providing a affirmative check bit change indication indicating a difference of the respective check bit from its respective original state if an odd number of data unit change indications have occurred.

18. The method of claim 17, wherein modifying the check bits of the ECC that have been determined to differ from their respective original states comprises changing the original state of the respective check bit in response to receiving an affirmative check bit change indication.

19. The method of claim 16, wherein generating a check bit change indication comprises providing a negative check bit change indication indicating no difference of the respective check bit from its respective original state if an even number of data unit change indications have occurred.

20. The method of claim 16, further comprising, for each of the check bits, disregarding the data unit change indications associated with data units of the second data that are not specified to be replaced.

21. An apparatus having a computer-readable medium encoded with instruction executed within the apparatus for updating one or more check bits of an Error Correction Code (ECC) associated with reference data, in response to merging one or more data units of modifying data with the reference data, comprising:
    a data unit enable module configured to store a plurality of enable bits, one for each of a first number of data units associated with the reference data, wherein the enable bits include one or more active enable bits identifying data units of the modifying data to be merged with the reference data;
    a plurality of check bit generation modules, one for each of the check bits of the ECC associated with the reference data, wherein each of the plurality of check bit generation modules comprises:
        a first stage array coupled to receive a set of corresponding data bits of the modifying data and the reference data according to a coding algorithm used to generate the ECC of the reference data, and to output a second number of change indications each indicating whether the merging of the one or more data units of modifying data with the reference data for a respective one of the first number of data units warrants a change in the check bit;
        a gating array coupled to the first stage array to receive the second number of change indications and coupled to the data unit enable module to receive the plurality of enable bits, and arranged to pass the change indications associated with the active enable bits;
        a second stage array coupled to the gating array to receive the change indications passed by the gating array, and arranged to generate a collective change indication; and
        a third stage array coupled to the second stage array to receive the collective change indication and coupled to receive a corresponding one of the check bits of the ECC associated with the reference data, and arranged to modify the corresponding one of the check bits of the ECC based on the collective change indication.

* * * * *